United States Patent
Dick et al.

(10) Patent No.: US 11,576,099 B2
(45) Date of Patent: *Feb. 7, 2023

(54) METHOD AND APPARATUS FOR MONITORING A PLURALITY OF CELLS AND ONE OR MORE DOWNLINK CHANNELS

(71) Applicant: Pantech Wireless, LLC, Cedar Park, TX (US)

(72) Inventors: Stephen G. Dick, Nesconset, NY (US); Stephen E. Terry, Northport, NY (US); Guodong Zhang, Syosset, NY (US); James M. Miller, Verona, NJ (US); Sung-Hyuk Shin, Northvale, NJ (US)

(73) Assignee: Pantech Wireless, LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,178

(22) Filed: Aug. 31, 2020

(65) Prior Publication Data

US 2020/0404568 A1    Dec. 24, 2020

Related U.S. Application Data

(63) Continuation of application No. 16/533,320, filed on Aug. 6, 2019, now Pat. No. 10,764,803, which is a
(Continued)

(51) Int. Cl.
*H04W 36/18*     (2009.01)
*H04L 1/1812*    (2023.01)
(Continued)

(52) U.S. Cl.
CPC ............ *H04W 36/18* (2013.01); *H04L 1/16* (2013.01); *H04L 1/1812* (2013.01);
(Continued)

(58) Field of Classification Search
CPC ....... H04L 1/16; H04L 1/1812; H04L 5/0055; H04L 2001/0092; H04W 36/18;
(Continued)

(56) References Cited

U.S. PATENT DOCUMENTS 5,628,631 A   5/1997 Aneha
5,794,149 A   8/1998 Hoo
(Continued)

FOREIGN PATENT DOCUMENTS

DE   10225428   12/2003
EP   0 977 393   2/2000
(Continued)

OTHER PUBLICATIONS

3GPP TS 25.133 V6.2.0, "3rd Generation Partnership Project; Technical Specification Group Radio Access Network; Requirements for Support of Radio Resource Management" (FDD); (Release 6); (Jun. 2003).
(Continued)

*Primary Examiner* — Hanh N Nguyen
(74) *Attorney, Agent, or Firm* — Volpe Koenig

(57) ABSTRACT

A wireless transmit/receive unit (WTRU) and a method comprising monitoring a plurality of cells for ACK/NACK information, each of the plurality of cells including a plurality of downlink channels, for each of the plurality of cells, determining a subset of the downlink channels for the cell, and, for each of the plurality of cells, monitoring the subset of downlink channels for one or more downlink messages.

18 Claims, 9 Drawing Sheets

Related U.S. Application Data continuation of application No. 15/212,403, filed on Jul. 18, 2016, now Pat. No. 10,390,279, which is a continuation of application No. 13/236,133, filed on Sep. 19, 2011, now Pat. No. 9,438,381, which is a continuation of application No. 10/925,426, filed on Aug. 25, 2004, now Pat. No. 8,023,463.

(60) Provisional application No. 60/585,174, filed on Jul. 2, 2004, provisional application No. 60/520,207, filed on Nov. 14, 2003, provisional application No. 60/508,797, filed on Oct. 3, 2003, provisional application No. 60/507,554, filed on Oct. 1, 2003, provisional application No. 60/497,747, filed on Aug. 25, 2003.

(51) Int. Cl.
| | |
|---|---|
| H04L 1/16 | (2023.01) |
| H04L 5/00 | (2006.01) |
| H04W 72/04 | (2023.01) |
| H04L 1/00 | (2006.01) |

(52) U.S. Cl.
CPC ......... H04L 5/0055 (2013.01); H04W 72/042 (2013.01); *H04L 2001/0092* (2013.01)

(58) Field of Classification Search
CPC ... H04W 72/042; H04W 28/04; H04W 36/02; H04W 36/10
See application file for complete search history.

(56) References Cited

U.S. PATENT DOCUMENTS

| | | | |
|---|---|---|---|
| 5,933,787 A | 8/1999 | Gilhousen et al. | |
| 5,946,320 A | 8/1999 | Decker et al. | |
| 6,351,460 B1 | 2/2002 | Tiedemann, Jr. et al. | |
| 6,414,947 B1 * | 7/2002 | Legg | H04J 13/16 370/331 |
| 6,434,396 B1 | 8/2002 | Rune | |
| 6,507,567 B1 * | 1/2003 | Willars | H04W 76/20 370/321 |
| 6,584,084 B1 | 6/2003 | Barany et al. | |
| 6,628,631 B1 | 9/2003 | Mazawa et al. | |
| 6,643,813 B1 | 11/2003 | Johansson et al. | |
| 6,650,905 B1 | 11/2003 | Toskala et al. | |
| 6,678,249 B2 | 1/2004 | Toskala et al. | |
| 6,678,523 B1 * | 1/2004 | Ghosh | H04L 1/1845 455/442 |
| 6,690,939 B1 * | 2/2004 | Jonsson | H04W 36/18 370/331 |
| 6,754,496 B2 | 6/2004 | Mohebbi et al. | |
| 6,778,830 B1 | 8/2004 | Oizumi et al. | |
| 6,799,045 B1 * | 9/2004 | Brouwer | H04W 52/343 455/442 |
| 6,829,482 B2 | 12/2004 | Rune et al. | |
| 6,850,771 B2 | 2/2005 | Malladi et al. | |
| 6,892,071 B2 | 5/2005 | Park et al. | |
| 6,907,245 B2 | 6/2005 | Ohlsson et al. | |
| 6,915,465 B2 | 7/2005 | Fujiwara et al. | |
| 6,970,716 B2 | 11/2005 | Rune et al. | |
| 6,977,888 B1 | 12/2005 | Frenger et al. | |
| 7,013,143 B2 | 3/2006 | Love et al. | |
| 7,026,911 B2 | 4/2006 | Aono et al. | |
| 7,046,648 B2 | 5/2006 | Zhang et al. | |
| 7,054,633 B2 | 5/2006 | Seo et al. | |
| 7,065,359 B2 | 6/2006 | Chuah et al. | |
| 7,082,304 B2 * | 7/2006 | Wakabayashi | H04W 36/18 455/441 |
| 7,103,729 B2 | 9/2006 | Altahan et al. | |
| 7,124,350 B2 | 10/2006 | Chao et al. | |
| 7,158,504 B2 | 1/2007 | Kadaba et al. | |
| 7,185,256 B2 | 2/2007 | Miki et al. | |
| 7,206,598 B2 | 4/2007 | Attar et al. | |
| 7,212,824 B2 | 5/2007 | Terry | |
| 7,266,384 B2 | 9/2007 | Kim et al. | |
| 7,269,420 B2 | 9/2007 | Heo et al. | |
| 7,277,407 B2 | 10/2007 | Kim et al. | |
| 7,283,508 B2 | 10/2007 | Choi et al. | |
| 7,283,509 B2 | 10/2007 | Moon et al. | |
| 7,283,782 B2 | 10/2007 | Sinnarajah et al. | |
| 7,315,741 B2 | 1/2008 | Chun | |
| 7,317,700 B2 | 1/2008 | Hwang | |
| 7,346,035 B2 | 3/2008 | Lee et al. | |
| 7,366,538 B2 | 4/2008 | Seki et al. | |
| 7,372,898 B2 | 5/2008 | Shin et al. | |
| 7,392,051 B2 | 6/2008 | Rajala et al. | |
| 7,403,513 B2 | 7/2008 | Lee et al. | |
| 7,414,989 B2 | 8/2008 | Kuchibhotla et al. | |
| 7,428,424 B2 | 9/2008 | Hwang et al. | |
| 7,433,337 B2 | 10/2008 | Chao et al. | |
| 7,519,016 B2 | 4/2009 | Lee et al. | |
| 7,558,230 B2 | 7/2009 | Lee et al. | |
| 7,606,205 B2 * | 10/2009 | Ranta-Aho | H04W 36/0007 370/335 |
| 7,848,290 B2 | 12/2010 | Cheng et al. | |
| 7,903,610 B2 | 3/2011 | Cheng et al. | |
| 7,974,630 B1 | 7/2011 | Haumont et al. | |
| 8,023,463 B2 | 9/2011 | Dick et al. | |
| 8,682,325 B1 | 3/2014 | Cooper | |
| 9,438,381 B2 | 9/2016 | Dick et al. | |
| 10,390,279 B2 | 8/2019 | Dick et al. | |
| 10,764,803 B2 * | 9/2020 | Dick | H04L 5/0055 |
| 2001/0020285 A1 | 9/2001 | Fujiwara et al. | |
| 2002/0080719 A1 | 6/2002 | Parkvall et al. | |
| 2002/0093937 A1 | 7/2002 | Kim et al. | |
| 2002/0095635 A1 | 7/2002 | Wager et al. | |
| 2002/0115460 A1 | 8/2002 | Rune et al. | |
| 2002/0115467 A1 | 8/2002 | Hamabe | |
| 2002/0141360 A1 | 10/2002 | Baba et al. | |
| 2002/0172208 A1 | 11/2002 | Malkamaki | |
| 2002/0191544 A1 | 12/2002 | Cheng et al. | |
| 2002/0198025 A1 | 12/2002 | Brownlee et al. | |
| 2003/0002470 A1 | 1/2003 | Park et al. | |
| 2003/0007480 A1 | 1/2003 | Kim et al. | |
| 2003/0031119 A1 | 2/2003 | Kim et al. | |
| 2003/0043786 A1 | 3/2003 | Kall et al. | |
| 2003/0054824 A1 | 3/2003 | Choi et al. | |
| 2003/0081692 A1 | 5/2003 | Kwan et al. | |
| 2003/0123403 A1 | 7/2003 | Jiang | |
| 2003/0123470 A1 | 7/2003 | Kim et al. | |
| 2003/0131124 A1 | 7/2003 | Yi et al. | |
| 2003/0147370 A1 * | 8/2003 | Wu | H04L 1/187 370/338 |
| 2003/0161284 A1 | 8/2003 | Chen | |
| 2003/0171118 A1 | 9/2003 | Miya | |
| 2003/0176195 A1 | 9/2003 | Dick et al. | |
| 2003/0189909 A1 | 10/2003 | Chao et al. | |
| 2003/0202500 A1 | 10/2003 | Ha et al. | |
| 2003/0210668 A1 | 11/2003 | Malladi et al. | |
| 2004/0004954 A1 | 1/2004 | Terry et al. | |
| 2004/0072567 A1 | 4/2004 | Cao et al. | |
| 2004/0085934 A1 | 5/2004 | Balachandran | |
| 2004/0109433 A1 | 6/2004 | Khan | |
| 2004/0120306 A1 | 6/2004 | Wigard et al. | |
| 2004/0160925 A1 | 8/2004 | Heo et al. | |
| 2004/0202129 A1 | 10/2004 | Kolding et al. | |
| 2004/0203991 A1 | 10/2004 | Chen et al. | |
| 2004/0219917 A1 | 11/2004 | Love et al. | |
| 2004/0219919 A1 | 11/2004 | Whinnett et al. | |
| 2004/0219920 A1 | 11/2004 | Love et al. | |
| 2004/0228313 A1 | 11/2004 | Cheng et al. | |
| 2005/0041694 A1 | 2/2005 | Liu | |
| 2005/0047354 A1 | 3/2005 | Zeira et al. | |
| 2005/0048920 A1 | 3/2005 | Liu | |
| 2005/0083888 A1 | 4/2005 | Smee et al. | |
| 2005/0207374 A1 | 9/2005 | Petrovic et al. | |
| 2006/0045010 A1 | 3/2006 | Baker et al. | |
| 2006/0092972 A1 | 5/2006 | Petrovic et al. | |
| 2006/0105796 A1 | 5/2006 | Malladi et al. | |

(56) References Cited

U.S. PATENT DOCUMENTS

| | | |
|---|---|---|
| 2006/0274712 A1 | 12/2006 | Malladi et al. |
| 2007/0047501 A1 | 3/2007 | Usuda et al. |
| 2007/0079207 A1 | 4/2007 | Seidel et al. |

FOREIGN PATENT DOCUMENTS

| | | |
|---|---|---|
| EP | 1 217 777 | 6/2002 |
| GB | 2 353 439 | 2/2001 |
| JP | 04-157821 | 5/1992 |
| JP | 2000-217139 | 8/2000 |
| JP | 2001-8251 | 1/2001 |
| JP | 2001-128209 | 5/2001 |
| JP | 2002-009741 | 1/2002 |
| JP | 2003-134180 | 5/2003 |
| JP | 2003-163960 | 6/2003 |
| JP | 2007-511135 | 4/2007 |
| KR | 20020095231 | 12/2002 |
| KR | 20030003943 | 1/2003 |
| KR | 20030040972 | 5/2003 |
| RU | 2003112283 | 12/2005 |
| RU | 2005110767 | 10/2006 |
| TW | 536896 | 6/2003 |
| TW | 200303689 | 9/2003 |
| WO | 99/027740 | 6/1999 |
| WO | 00/35226 | 6/2000 |
| WO | 00/074263 | 12/2000 |
| WO | 02/01893 | 1/2002 |
| WO | 02/37572 | 5/2002 |
| WO | 02/037872 | 5/2002 |
| WO | 02/047317 | 6/2002 |
| WO | 02/082108 | 10/2002 |
| WO | 02/101966 | 12/2002 |
| WO | 02/102109 | 12/2002 |
| WO | 03/003643 | 1/2003 |
| WO | 03/026231 | 3/2003 |
| WO | 03/037027 | 5/2003 |
| WO | 03/047155 | 6/2003 |
| WO | 03/053087 | 6/2003 |
| WO | 2003/049481 A1 | 6/2003 |
| WO | 03/067953 | 8/2003 |
| WO | 03/088545 | 10/2003 |
| WO | 2005/048503 | 5/2005 |

OTHER PUBLICATIONS

3GPP TS 25.133 V6.6.0, 3rd Generation Partnership Project; Technical Specification Group Radio Access Network; "Requirements for Support of Radio Resource Management" (FDD); (Release 6); (Jun. 2004).
3GPP TS 25.308 V5.4.0, 3rd Generation Partnership Project; Technical Specification Group Radio Access Network; "High Speed Downlink Packet Access (HSDPA)"; Stage 2 (Release 5); (Mar. 2003).
3GPP TS 25.308 V6.1.0, 3rd Generation Partnership Project; Technical Specification Group Radio Access Network; "High Speed Downlink Packet Access (HSDPA)"; Stage 2 (Release 6); (Mar. 2004).
3GPP TS 25.309 V0.2.0, 3rd Generation Partnership Project; Technical Specification Group Radio Access Network; "FDD Enhanced Uplink"; Stage 2 (Release 6); (Jun. 2004).
3GPP, "3$^{rd}$ Generation Partnership Project, Technical Specification Group Radio Access Network; Feasibility Study for Enhanced Uplink for UTRA FDD", (Release 6, 3GPP TR 25.896, V.0.4.2 (R1-030952) (Sep. 2003).
3GPP, "3rd Generation Partnership Project; Technical Specification Group Radio Access Network; Medium Access Control (MAC) protocol specification (Release 6)," 3GPP TS 25.321 V6.2.0 (Jun. 2004).
3GPP, "3rd Generation Partnership Project; Technical Specification Group Radio Access Network; Physical Layer Procedures (FDD) (Release 6)," 3GPP TS 25.214 V6.2.0 (Jun. 2004).

3GPP, "3rd Generation Partnership Project; Technical Specification Group Radio Access Network; Physical Layer Procedures (FDD) (Release 5)," 3GPP TS 25.214 V5.9.0 (Jun. 2004).
3GPP, "3rd Generation Partnership Project; Technical Specification Group Radio Access Network; Physical Layer Procedures (FDD) (Release 5)," 3GPP TS 25.214 V5.5.0 (Jun. 2003).
3GPP, "3rd Generation Partnership Project; Technical Specification Group Radio Access Network; Physical Layer Procedures (FDD) (Release 4)," 3GPP TS 25.214 V4.6.0 (Mar. 2003).
3GPP, "3rd Generation Partnership Project; Technical Specification Group Radio Access Network; Physical Layer Procedures (FDD) (Release 1999)," 3GPP TS 25.214 V3.12.0 (Mar. 2003).
3GPP, "3rd Generation Partnership Project; Technical Specification Group Radio Access Network; Medium Access Control (MAC) protocol specification (Release 1999)," 3GPP TS 25.321 V3.17.0 (Jun. 2004).
3GPP, "3rd Generation Partnership Project; Technical Specification Group Radio Access Network; Medium Access Control (MAC) protocol specification (Release 1999)," 3GPP TS 25.321 V3.15.0 (Mar. 2003).
3GPP, "3rd Generation Partnership Project; Technical Specification Group Radio Access Network; Medium Access Control (MAC) protocol specification (Release 5)," 3GPP TS 25.321 V5.5.0 (Jun. 2003).
3GPP, "3rd Generation Partnership Project; Technical Specification Group Radio Access Network; Medium Access Control (MAC) protocol specification (Release 5)," 3GPP TS 25.321 V5.6.0 (Sep. 2003).
3GPP, "3rd Generation Partnership Project; Technical Specification Group Radio Access Network; Medium Access Control (MAC) protocol specification (Release 4)," 3GPP TS 25.321 V4.10.0 (Jun. 2004).
3GPP, "3rd Generation Partnership Project; Technical Specification Group Radio Access Network; Medium Access Control (MAC) protocol specification (Release 4)," 3GPP TS 25.321 V4.8.0 (Mar. 2003).
3GPP, "3rd Generation Partnership Project; Technical Specification Group Radio Access Network; Medium Access Control (MAC) protocol specification (Release 5)," 3GPP TS 25.321 V5.9.0 (Jun. 2004).
3GPP, "3rd Generation Partnership Project; Technical Specification Group Radio Access Network; High Speed Downlink Packet Access (HSDPA); Stage 2 (Release 5)," 3GPP TS 25.308 V5.5.0 (Mar. 2004).
3GPP, "3rd Generation Partnership Project; Technical Specification Group Radio Access Network; Physical channels and mapping of transport channels onto physical channels (FDD) (Release 1999)," 3GPP TS 25.211 V3.12.0 (Sep. 2002).
3GPP, "3rd Generation Partnership Project; Technical Specification Group Radio Access Network; Physical channels and mapping of transport channels onto physical channels (FDD) (Release 4)," 3GPP TS 25.211 V4.6.0 (Sep. 2002).
3GPP, "3rd Generation Partnership Project; Technical Specification Group Radio Access Network; Physical channels and mapping of transport channels onto physical channels (FDD) (Release 5)," 3GPP TS 25.211 V5.5.0 (Sep. 2003).
3GPP, "3rd Generation Partnership Project; Technical Specification Group Radio Access Network; Physical channels and mapping of transport channels onto physical channels (FDD) (Release 5)," 3GPP TS 25.211 V5.4.0 (Jun. 2003).
3GPP, "3rd Generation Partnership Project; Technical Specification Group Radio Access Network; Physical channels and mapping of transport channels onto physical channels (FDD) (Release 6)," 3GPP TS 25.211 V6.1.0 (Jun. 2004).
3GPP, "3rd Generation Partnership Project; Technical Specification Group Radio Access Network; Requirements for support of radio resource management (FDD) (Release 5)," 3GPP TS 25.133 V5.11.0 (Jun. 2004).
3GPP, "3rd Generation Partnership Project; Technical Specification Group Radio Access Network; Requirements for support of radio resource management (FDD) (Release 5)," 3GPP TS 25.133 V5.7.0 (Jun. 2003).

(56) References Cited

OTHER PUBLICATIONS

3GPP, "3rd Generation Partnership Project; Technical Specification Group Radio Access Network; Requirements for support of radio resource management (FDD) (Release 4)," 3GPP TS 25.133 V4.12.0 (Mar. 2004).
3GPP, "3rd Generation Partnership Project; Technical Specification Group Radio Access Network; Requirements for support of radio resource management (FDD) (Release 4)," 3GPP TS 25.133 V4.9.0 (Jun. 2003).
3GPP, "3rd Generation Partnership Project; Technical Specification Group Radio Access Network; Requirements for support of radio resource management (FDD) (Release 1999)," 3GPP TS 25.133 V3.18.0 (Jun. 2004).
3GPP, "3rd Generation Partnership Project; Technical Specification Group Radio Access Network; Requirements for support of radio resource management (FDD) (Release 1999)," 3GPP TS 25.133 V3.14.0 (Jun. 2003).
3GPP, "3rd Generation Partnership Project; Technical Specification Group Radio Access Network; Feasibility Study for Enhanced Uplink for UTRA FDD (Release 6)," 3GPP TR 25.896 V6.0.0 (Mar. 2004).
3GPP, "3rd Generation Partnership Project; Technical Specification Group Radio Access Network; Multiplexing and channel coding (FDD) (Release 1999)," 3GPP TS 25.212 V3.11.0 (Sep. 2002).
3GPP, "3rd Generation Partnership Project; Technical Specification Group Radio Access Network; Multiplexing and channel coding (FDD) (Release 4)," 3GPP TS 25.212 V4.6.0 (Sep. 2002).
3GPP, "3rd Generation Partnership Project; Technical Specification Group Radio Access Network; Multiplexing and channel coding (FDD) (Release 5)," 3GPP TS 25.212 V5.9.0 (Jun. 2004).
3GPP, "3rd Generation Partnership Project; Technical Specification Group Radio Access Network; Multiplexing and channel coding (FDD) (Release 6)," 3GPP TS 25.212 V6.2.0 (Jun. 2004).
3GPP, "3rd Generation Partnership Project; Technical Specification Group Radio Access Network; Multiplexing and channel coding (FDD) (Release 5)," 3GPP TS 25.212 V5.5.0 (Jun. 2003).
3GPP, "3rd Generation Partnership Project; Technical Specification Group Radio Access Network; Radio Resource Control (RRC) protocol specification (Release 1999)," 3GPP TS 25.331 V3.15.0 (Jun. 2003).
3GPP, "3rd Generation Partnership Project; Technical Specification Group Radio Access Network; Radio Resource Control (RRC) protocol specification (Release 1999)," 3GPP TS 25.331 V3.19.0 (Jun. 2004).
3GPP, "3rd Generation Partnership Project; Technical Specification Group Radio Access Network; Radio Resource Control (RRC); Protocol Specification (Release 4)," 3GPP TS 25.331 V4.10.0 (Jun. 2003).
3GPP, "3rd Generation Partnership Project; Technical Specification Group Radio Access Network; Radio Resource Control (RRC); Protocol Specification (Release 4)," 3GPP TS 25.331 V4.14.0 (Jun. 2004).
3GPP, "3rd Generation Partnership Project; Technical Specification Group Radio Access Network; Radio Resource Control (RRC); Protocol Specification (Release 5)," 3GPP TS 25.331 V5.5.0 (Jun. 2003).
3GPP, "3rd Generation Partnership Project; Technical Specification Group Radio Access Network; Radio Resource Control (RRC); Protocol Specification (Release 5)," 3GPP TS 25.331 V5.9.0 (Jun. 2004).
3GPP, "3rd Generation Partnership Project; Technical Specification Group Radio Access Network; Radio Resource Control (RRC); Protocol Specification (Release 6)," 3GPP TS 25.331 V6.2.0 (Jun. 2004).
3GPP, "3rd Generation Partnership Project; Technical Specification Group Radio Access Network; UTRAN lub interface NBAP signaling (Release 1999)," 3GPP TS 25.433 V3.14.1 (Jun. 2004).
3GPP, "3rd Generation Partnership Project; Technical Specification Group Radio Access Network; UTRAN lub interface NBAP signaling (Release 1999)," 3GPP TS 25.433 V3.13.0 (Mar. 2003).
3GPP, "3rd Generation Partnership Project; Technical Specification Group Radio Access Network; UTRAN lub interface NBAP signaling (Release 4)," 3GPP TS 25.433 V4.9.0 (Jun. 2003).
3GPP, "3rd Generation Partnership Project; Technical Specification Group Radio Access Network; UTRAN lub interface NBAP signaling (Release 4)," 3GPP TS 25.433 V4.12.0 (Mar. 2004).
3GPP, "3rd Generation Partnership Project; Technical Specification Group Radio Access Network; UTRAN lub interface NBAP signaling (Release 5)," 3GPP TS 25.433 V5.5.0 (Jun. 2003).
3GPP, "3rd Generation Partnership Project; Technical Specification Group Radio Access Network; UTRAN lub interface NBAP signaling (Release 5)," 3GPP TS 25.433 V5.9.0 (Jun. 2004).
3GPP, "3rd Generation Partnership Project; Technical Specification Group Radio Access Network; UTRAN lub interface NBAP signaling (Release 6)," 3GPP TS 25.433 V6.2.0 (Jun. 2004).
3GPP, 3rd Generation Partnership Project; Technical Specification, Universal Mobile Telecommunications System; Multiplexing and Channel Coding (FDD), 3GPP TS 25.212, V6.7.0, Release 6, (Dec. 2015).
3GPP, 3rd Generation Partnership Project; Technical Specification, Universal Mobile Telecommunications System; FDD Enhanced Uplink; Overall Description; Stage 2, 3GPP TS 25.309, V6.6.0, Release 6, (Mar. 2006).
3GPP2 C.20003-C, "Medium Access Control (MAC) Standard for cdma2000 Spread Spectrum Systems", $3^{rd}$ Generation Partnership Project 2 "3GPP2", Version 2.0, Release C, (Aug. 2004).
3GPP2 C.S0002-C, "Physical Layer Standard for cdma2000 Spread Spectrum Systems", $3^{rd}$ Generation Partnership Project 2 "3GPP2", Version 2.0, Revision C, (Jul. 23, 2004).
3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, (Jul. 23, 2004).
3GPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, (Jul. 23, 2004).
3rd Generation Partnership Project; Technical Specification Group Radio Access Network; Feasibility Study for Enhanced Uplink for Utra FDD; (Release 6), 3GPP TR 25.896 V0.2.1 (Feb. 2003) R1-030372, pp. 14-17 (Feb. 26, 2003).
3rd Generation Partnership Project; Technical Specification Group Radio Access Network; Feasibility Study for Enhanced Uplink for UTRA FDD; (Release 6), 3GPP TR 25.896 V1.0.2 (Oct. 2003).
Ericsson et al., "Hybrid ARQ text proposal for Section 7 of TR25.896" TSG-RAN WG1 #31, R1-030208, Tokyo, Japan, 4 pages (Feb. 18-21, 2002).
ETSI, UMTS XX.15 V0.3.0, Utra Handover, 22 pp. (Jan. 1999).
Heck et al., "Diversity Effects on the Soft Handover Gain in UMTS Networks," Proceedings of the IEEE Vehicular Technology Conference, vol. 2, pp. 1269-1273 (Sep. 2002).
Interdigital, "Performance Analysis of HARQ in Soft Handover," 3GPP TSG-RAN WG1 #34 meeting, R1-030979 (Oct. 6-10, 2003).
Motorola, "Improvements to Site Selection Diversity Transmission (SSDT)", TSG-RAN Working Group 1 Meeting #3, 22-26, Stockholm, Sweden, pp. 1-5 (Mar. 1999).
Panasonic, "Harq Operation During Soft Handover," 3GPP TSG-RAN WG1 Meeting #33 R1-030802, 3GPP, (Aug. 25, 2003).
Qualcomm, "Impact of Downlink Support Channels," 3GPP TSG RAN WG1 #32, Tdoc R1-03-0433, Paris, France (May 19-23, 2003).
Qualcomm, "Channel Structure for Consideration in Enhanced Uplink" 3gpp tsg ran WG1 #31, Tdoc R1-03-0273 Tokyo, Japan, (Feb. 18-21, 2003).
R1-030733, "HARQ overhead issues", Nokia, TSG-RAN1 #33 (Aug. 25-29, 2003).
R1-030765, "HARQ performance in soft handover", Samsung, TSG RAN1 #33 (Aug. 25-29, 2003).
R1-030803, "HARQ operation during Soft Handover", Panasonic, TSG RAN1 #33 (2003).
Samsung Electronics. "Harq Structure," 3GPP TSG-RAN WG1 #31 Meeting R1-030247, (Feb. 17, 2003).
Samsung, "Transport Channel Multiplexing Options Considering SHO," 3GPP TSG RAN WG1 #33 R1-030767, (Aug. 20, 2003).

(56) References Cited

OTHER PUBLICATIONS

Ericsson, "E-DCH multiplexing and transport channel structure," TSG-RAN Working Group 2 meeting #42, Tdoc R2-040917, Montreal, Canada, (May 2004).

Holma et al., "WCDMA for UMTS—Radio Access for Third Generation Mobile Communications," First Edition, (2000).

3GPP, "3rd Generation Partnership Project; Technical Specification Group Radio Access Network; UTRAN lub Interface User Plane Protocols for Common Transport Channel data streams (Release 5)," 3GPP TS 25.435 V5.5.0 (Jun. 2003).

3GPP, "3rd Generation Partnership Project; Technical Specification Group Radio Access Network; UTRAN lub Interface User Plane Protocols for Common Transport Channel data streams (Release 6)," 3GPP TS 25.435 V6.1.0 (Mar. 2004).

3GPP, "3rd Generation Partnership Project; Technical Specification Group Radio Access Network; Radio resource management strategies (Release 5)," 3GPP TR 25.922 V5.0.0 (Mar. 2002).

Universal Mobile Telecommunications System (UMTS); "Radio resource management strategies (3GPP TR 25.922 version 6.0.1 Release 6)," ETSI TR 125 922 V6.0.1 (Apr. 2004).

Third Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6), 3GPP TS 44.060 V6.3.0 (Jul. 2003).

Third Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6), 3GPP TS 44.060 V6.8.0 (Jul. 2004).

\* cited by examiner

METHOD AND APPARATUS FOR MONITORING A PLURALITY OF CELLS AND ONE OR MORE DOWNLINK CHANNELS

CROSS REFERENCE TO RELATED APPLICATIONS

This application is a continuation of U.S. patent application Ser. No. 16/533,320 filed on Aug. 6, 2019, which is a continuation of U.S. patent application Ser. No. 15/212,403, filed on Jul. 18, 2016, which issued as U.S. Pat. No. 10,390,279 on Aug. 20, 2019, which is a continuation of U.S. patent application Ser. No. 13/236,133 filed on Sep. 19, 2011, which issued as U.S. Pat. No. 9,438,381 on Sep. 6, 2016, which is a continuation of U.S. patent application Ser. No. 10/925,426, filed on Aug. 25, 2004, which issued as U.S. Pat. No. 8,023,463 on Sep. 20, 2011, which claims priority from U.S. Provisional Application Nos. 60/497,747 filed on Aug. 25, 2003; 60/507,554 filed on Oct. 1, 2003; 60/508,797 filed on Oct. 3, 2003; 60/520,207 filed on Nov. 14, 2003 and 60/585,174 filed on Jul. 2, 2004, which are incorporated by reference as if fully set forth. This application is related to U.S. patent application Ser. No. 15/212,402, filed Jul. 18, 2016, which issued as U.S. Pat. No. 10,251,106 on Apr. 2, 2019.

FIELD OF INVENTION

The present invention is related to a wireless communications. More particularly, the present invention is related to an enhanced uplink (EU) operation during a soft handover.

BACKGROUND

Cellular wireless communication networks are divided into a plurality of coverage regions. Each coverage region in the network is served by a Node-B. As a wireless transmit/receive unit (WTRU) travels, it may move from one coverage region to another in the network.

The WTRU is served by the designated Node-B for a particular coverage region. The regions covered by Node-Bs overlap each other, and at the boundary of the region a WTRU can establish connections with more than one Node-B. As the WTRU moves from one coverage region to another in the network, the WTRU goes through handover. Soft handover is widely used to ensure communication without interruption while roving around a plurality of cells.

Soft handover occurs when a WTRU is connected to two or more Node-Bs simultaneously, on the same frequency. In soft handover, all Node-Bs serving the WTRU process the received data, which is then routed to a radio network controller (RNC) for macro diversity combining. For simplicity, the RNC may use an error detection technique such as a Cyclic Redundancy Check (CRC) and may accept a packet that passes the CRC.

Softer handover is a special case of soft handover. When a WTRU is in softer handover, the WTRU is connected to two or more cells belonging to the same Node-B. In contrast to soft handover, in softer handover macro diversity with or without maximum ratio combining can be performed in the Node-B.

Automatic repeat request (ARQ) is a technique whereby the receiver requests a retransmission of packets by the transmitter if errors are detected. Hybrid ARQ (H-ARQ) is a technique whereby transmitted data blocks are encoded for partial error correction at the receiver, and only data blocks with uncorrected errors are retransmitted. In prior art, i.e. in high speed downlink packet access (HSDPA), the H-ARQ functionality is terminated and controlled by the Node-B, (a technique called Node-B-controlled H-ARQ), allowing for rapid transmissions and retransmissions of erroneously received packets. This feature was both highly desirable and practical because H-ARQ in HSDPA was not required for soft handover. This feature would be highly desirable for EU also, but problems exist because it is intended for EU (and H-ARQ) to operate during soft handover.

One of the problems with Node-B-controlled H-ARQ in soft handover is the link imbalance. Since the associated uplink (UL) and downlink (DL) control signaling does not benefit from the soft handover gain, it might be error prone and require significant power offsets. In the DL direction, the WTRU may not be able to receive the acknowledge (ACK) or non-acknowledge (NACK) signals from all involved Node-Bs. In the UL, not all involved Node-Bs may be able to receive the associated control signaling from the WTRU, which may lead to soft buffer corruption.

A soft buffer is a buffer for implementing H-ARQ in a Node-B. Data packets received, but not acknowledged, by the Node-B are temporarily stored in the soft buffer for incremental combining. Therefore, a data packet transmitted, but not acknowledged previously, is combined with a retransmission of the same data packet transmitted in response to NACK signaling. Chase combining is a special case of an incremental combining. The soft buffer corruption causes misalignment of an H-ARQ protocol state among different Node-Bs and leads to loss of the soft handover gain. It would be desirable to achieve efficient H-ARQ operation without the problems associated with prior art systems.

Node-Bs can often make more efficient decisions and manage UL radio resources on a short-term basis better than an RNC, even if the RNC retains overall control over Node-Bs. In order for a Node-B to assign UL radio resources to WTRUs in EU operation, the Node-B must know several WTRU-specific parameters. Under the current 3GPP standard, only the RNC can know the WTRU-specific parameters by means of radio resource control (RRC) messages. Therefore, it is necessary to forward the information to the Node-B for proper scheduling of radio resources in EU transmissions.

An RNC maintains an active set of cells for each WTRU in soft handover. The RNC bases its decision to add to or remove cells from the WTRU's active set upon measurements provided by a WTRU and a Node-B and on management of available radio resources in each cell. Under the current 3GPP standards, the RNC applies RRC radio bearer (RB) control procedures to coordinate active set cells with the WTRU, and Node-B application part/radio network subsystem application part (NBAP/RNSAP) radio link procedures to coordinate active set cells with each Node-B.

During soft handover, some information should be communicated between network entities to support EU operation. The information includes, but is not limited to, information related to an active set, information regarding a Node-B that controls transmissions during soft handover, EU scheduling information during soft handover, and ACK/NACK status information during soft handover. The current 3GPP standards do not define specific protocols to transfer necessary information which are imperative in operation of EU during soft handover. Therefore, it is necessary to define a protocol for transferring WTRU-specific information and other EU related information among an RNC, a Node-B, and a WTRU so that a Node-B is enabled to schedule radio resources and EU connections are handed over properly during soft handover.

SUMMARY

The present invention is related to EU operation during a soft handover in a wireless communication system. The wireless communication system comprises a WTRU, at least two Node-Bs, and an RNC. In accordance with one embodiment of the present invention, for each WTRU one Node-B is designated as a primary Node-B and any other Node-B within the EU active set as a non-primary Node-B. The primary Node-B controls EU operation during soft handover including EU scheduling and H-ARQ. Soft buffer corruption is avoided by controlling H-ARQ during soft handover only by the primary Node-B. Alternatively, an RNC may control EU operation during soft handover including H-ARQ. In this case, an RNC generates final ACK/NACK decision based on the error check results of the Node-Bs.

DETAILED DESCRIPTION OF THE PREFERRED EMBODIMENTS

Figure 1A:
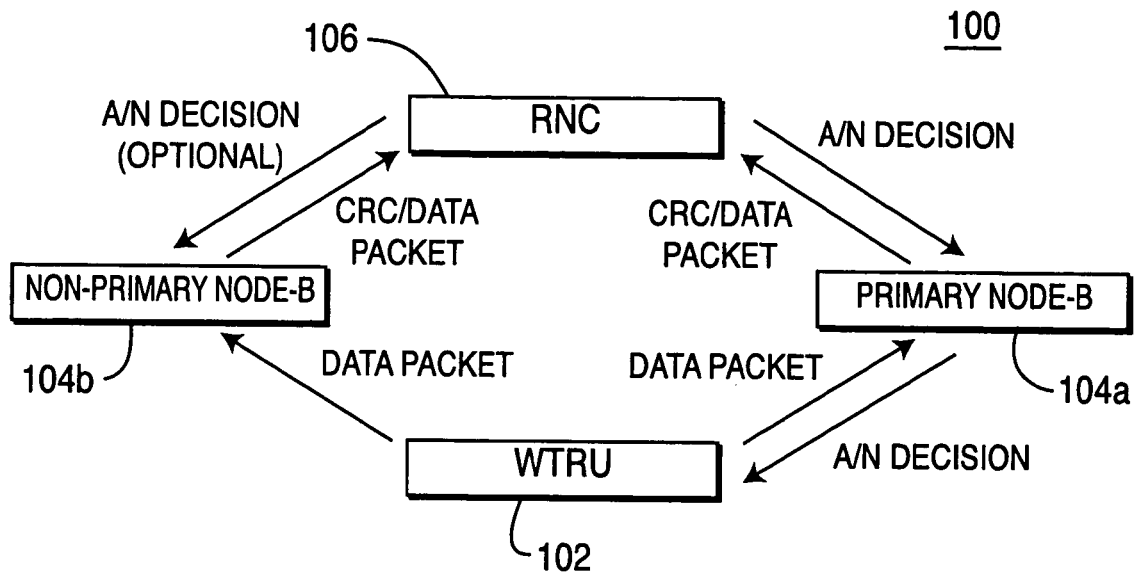
FIGS. 1A and 1B are diagrams of the first embodiment of the present invention.

The present invention will be described with reference to the drawing figures wherein like numerals represent like elements throughout.

When referred to hereafter, the terminology "WTRU" includes but is not limited to a user equipment, a mobile station, fixed or mobile subscriber unit, pager, or any other type of device capable of operating in a wireless environment. When referred to hereafter, the terminology "Node-B" includes but is not limited to a base station, site controller, access point or any other type of interfacing device in a wireless environment.

Figure 1B:
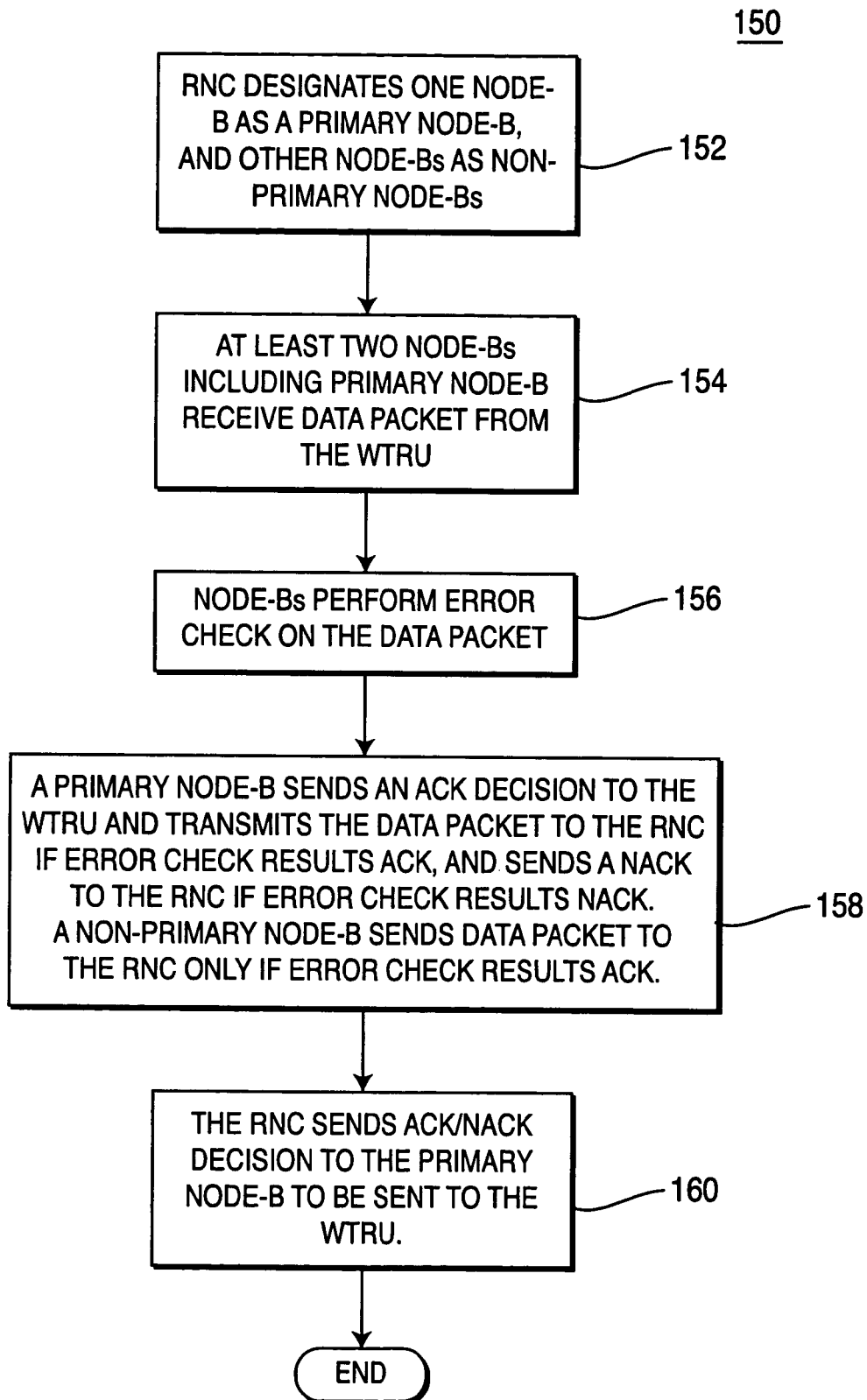

FIGS. 1A and 1B are diagrams of a system 100 and a process 150 of a first embodiment of the present invention. The WTRU 102 establishes connections with at least two cells controlled by different Node-Bs 104a, 104b for soft handover. Data packets transmitted from the WTRU 102 are received and processed separately by at least two Node-Bs 104a, 104b during soft handover (step 152).

One Node-B in a group of Node-Bs in an "active set" is designated as a primary Node-B 104a, while other Node-Bs in the active set are designated as non-primary Node-Bs 104b. An RNC 106 or the WTRU 102 makes this decision (step 152). If it is decided by an RNC 106, the RNC 106 informs all Node-Bs 104a, 104b and the WTRU 102. If it is decided by a WTRU 102, the WTRU 102 informs either all Node-Bs 104a, 104b or the RNC 106 which in turn informs all the Node-Bs 104a, 104b.

In making a decision regarding the primary Node-B 104a, the RNC 106 may use statistics, i.e. the number of successful decodings of particular WTRUs transmissions by each Node-B 104a, 104b, to identify the Node-B 104a, 104b with the best UL performance. It is the performance of the best cell controlled by a Node-B that is evaluated, not the performance of all cells associated with a Node-B. The RNC 106 may also select the primary Node-B 104a by evaluating both UL performance as described above and DL performance as obtained from WTRU 102 measurements. The RNC 106 then notifies the Node-Bs 104a, 104b and the WTRU 102 regarding which one will be the primary Node-B 104a via Iub signaling and RRC signaling, respectively. The WTRU 102 may also be informed of the primary Node-B 104a by fast layer 1 signaling from Node-B.

The primary Node-B 104a employs incremental combining, while non-primary Node-Bs 104b may or may not use incremental combining. If the non-primary Node-Bs 104b do not use incremental combining, the non-primary Node-Bs 104b may use simple ARQ, and may always refresh their buffers and not perform any combining. This scheme eliminates the problem of soft buffer corruption in soft handover. If both a primary Node-B 104a and non-primary Node-Bs 104b perform incremental combining, soft buffer corruption may be eliminated with a new data indicator or a sequence number in physical control signaling sent by the WTRU 102 to inform Node-Bs 104a, 104b which data packet is being transmitted, and thereby the Node-Bs 104a, 104b can manage soft buffer without corruption.

All Node-Bs 104a, 104b in the active set receive a data packet from the WTRU 102 (step 154). Each Node-B 104a, 104b performs an error check on the data packet and generates an indication of success or failure in decoding the data packet (step 156). Determining whether a data packet is successfully received is performed via an error check procedure; such as implementing a cyclic redundancy check (CRC). The indication of success or failure in decoding the data packet by the Node-Bs can be configured in a variety of different forms, but will be referred to hereinafter as a CRC result, or an ACK/NACK, in all embodiments of the present invention. However, any type of error checking may be performed in accordance with the teachings of the present invention, and it should be understood that the term "CRC" or "ACK/NACK" is used only as an illustration, not as a limitation, of the present invention.

When a Node-B 104a, 104b correctly decodes the data packet as determined by the error check, the Node-B 104a, 104b transmits the data packet to the RNC 106. If the primary Node-B 104a derives an ACK from the data packet, it transmits an ACK signal to the WTRU 102 and the RNC 106 without waiting for the CRC results from non-primary Node-Bs 104b, and refreshes soft buffer (step 158). If the primary Node-B 104a derives a NACK from the data packet, it transmits a NACK to the RNC and waits for the final decision from the RNC or CRC results from non-primary Node-Bs forwarded through the RNC 106 (step 158). The primary Node-B 104a may set a timer as will be explained hereinafter. The primary Node-B 104a transmits an ACK/

NACK signal to the WTRU 102 in accordance with the final decision made by the RNC 106 or CRC results forwarded from non-primary Node-Bs 104b.

Non-primary Node-Bs 104b transmit a data packet to the RNC 106 only if they derive an ACK from the data packet (step 158). The RNC 106 makes an ACK/NACK decision (step 160). If the RNC 106 receives at least one ACK from Node-Bs 104a, 104b, the RNC 106 makes an ACK decision, and if the RNC 106 receives no ACK from Node-Bs 104a, 104b within a predetermined time period, the RNC 106 makes a NACK decision. The RNC 106 transmits an ACK/NACK decision to the primary Node-B 104a. The RNC 106 may not send an ACK decision to the primary Node-B 104a when the primary Node-B 104a derives an ACK. The RNC 106 optionally transmits the ACK/NACK decision to the non-primary Node-Bs 104b for soft buffer management depending on the scheme of incremental combining at the non-primary Node-Bs 104b.

It is optional for the RNC 106 to use the packets delivered from non-primary Node-Bs 104b. If the RNC 106 uses the packet from non-primary Node-Bs 104b, a media access control (MAC) function of the RNC 106 performs an in-sequence delivery mechanism over all the received packets from all the involved Node-Bs 104a, 104b. If a Radio Link Control (RLC) layer realized an out of sequence transmission it assumes data is lost and requests retransmission. If the RNC 106 does not use the packets from non-primary Node-Bs 104b, the RNC 106 processes only the packets received from the primary Node-B 104a. The RNC 106 extracts and enters the data packet into the MAC level reordering buffer. After the RNC MAC performs the re-sequencing process, it sends the data to the RLC layer. Missed packets are identified and notified to the WTRU 102 through RLC messaging.

Figure 5:
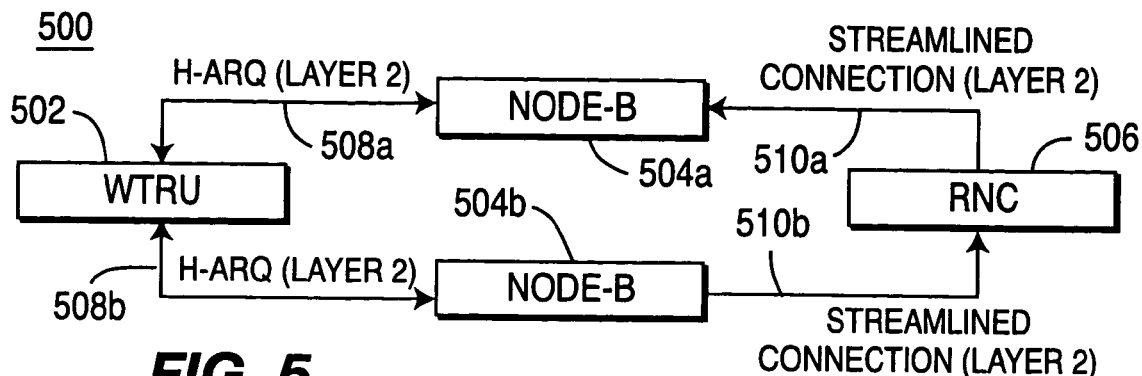
FIG. 5 is a diagram showing a streamlined connection between Node-Bs and an RNC in accordance with the present invention.

Optionally, a streamlined connection may be implemented in transmission of the result of the error check between Node-Bs and an RNC. A fast streamlined connection is explained with reference to FIG. 5. The streamlined connection is dedicated to fast signaling between the RNC 506 and the Node-Bs 504a, 504b, and eliminates a long delay between the RNC 506 and Node-Bs 504a, 504b. A high speed streamlined connection 510a, 510b is established between Node-Bs 504a, 504b and an RNC 506. CRC results from Node-Bs 504a, 504b to the RNC 506 and an ACK/NACK decisions from the RNC 506 to Node-Bs 504a, 504b are transmitted via the streamlined connections 510a, 510b. No direct physical link is required between Node-Bs 504a, 504b. Rather, a logical channel between Node-Bs 504a, 504b is required. The RNC 506 coordinates establishing the logical channel.

A fast streamlined connection 510a, 510b may be implemented in accordance with two alternatives. In accordance with the first alternative, two logical channels are established between an RNC 506 and two Node-Bs 504a, 504b, respectively. The RNC 506 receives H-ARQ signaling 510b from one Node-B 504b and processes it before forwarding it 510a to another Node-B 504a. The RNC 506 recognizes the status of H-ARQ process of each Node-B 504a, 504b by processing the signaling. As explained above, the CRC results are processed by the RNC 506 and the RNC 506 makes a final ACK/NACK decision and transmits the ACK/NACK decision to the Node-Bs 504a, 504b.

Upon reception of the first ACK from any Node-B 504a, 504b in the RNC 506, the RNC 506 transmits ACK decision to all Node-Bs 504a, 504b. In the case that all Node-Bs 504a, 504b derive a NACK, it takes some time to wait for all Node-Bs 504a, 504b to provide the CRC results. Therefore, optionally the RNC 506 may set a timer waiting for all Node-B's responses and if the timer expires the RNC 506 transmits a NACK to all Node-Bs 504a, 504b.

In accordance with the second alternative, a single logical channel between two Node-Bs 504a, 504b via an RNC 506 is established. The RNC 506 receives CRC results from one Node-B 504b and just forwards it to another Node-B 504a without processing it. This process is fast since the signaling is just routed between Node-Bs 504a, 504b without processing at the RNC 506. Therefore, it avoids the processing delay and protocol delay at the RNC 506. Each Node-B 504a, 504b derives the final ACK/NACK decision based on the collected CRC results from all the involved Node-Bs 504a, 504b in the active set. If there is at least one ACK from any Node-B, a final ACK decision will be made at each Node-B 504a, 504b. Otherwise, a final decision of NACK will be made by the Node-B 504a, 504b. As stated above, each Node-B 504a, 504b generates an ACK decision upon reception of the first ACK from any Node-B 504a, 504b. The Node-Bs 504a, 504b may set a timer waiting for an ACK from other Node-Bs 504a, 504b, and if the Node-Bs 504a, 504b do not receive any ACK before the expiration of the timer, the Node-Bs 504a, 504b generates a NACK decision.

The streamlined connection 510a, 510b between Node-Bs 504a, 504b and an RNC 506 may be implemented in any embodiment of the present invention described herein.

Figure 6:
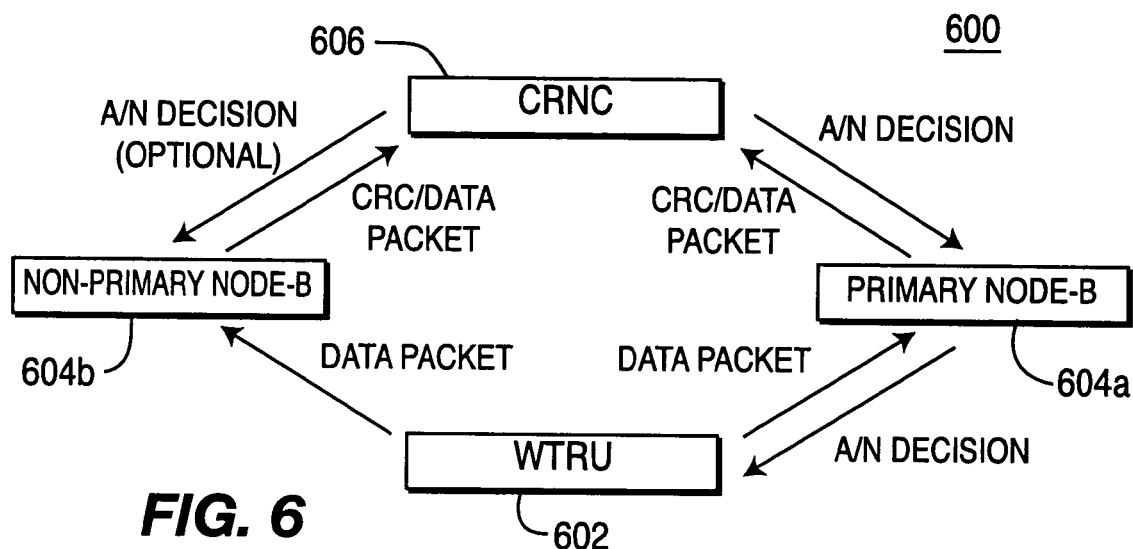
FIGS. 6 and 7 are diagrams of systems for transferring ACK/NACK signals in accordance with the present invention.
Figure 7:
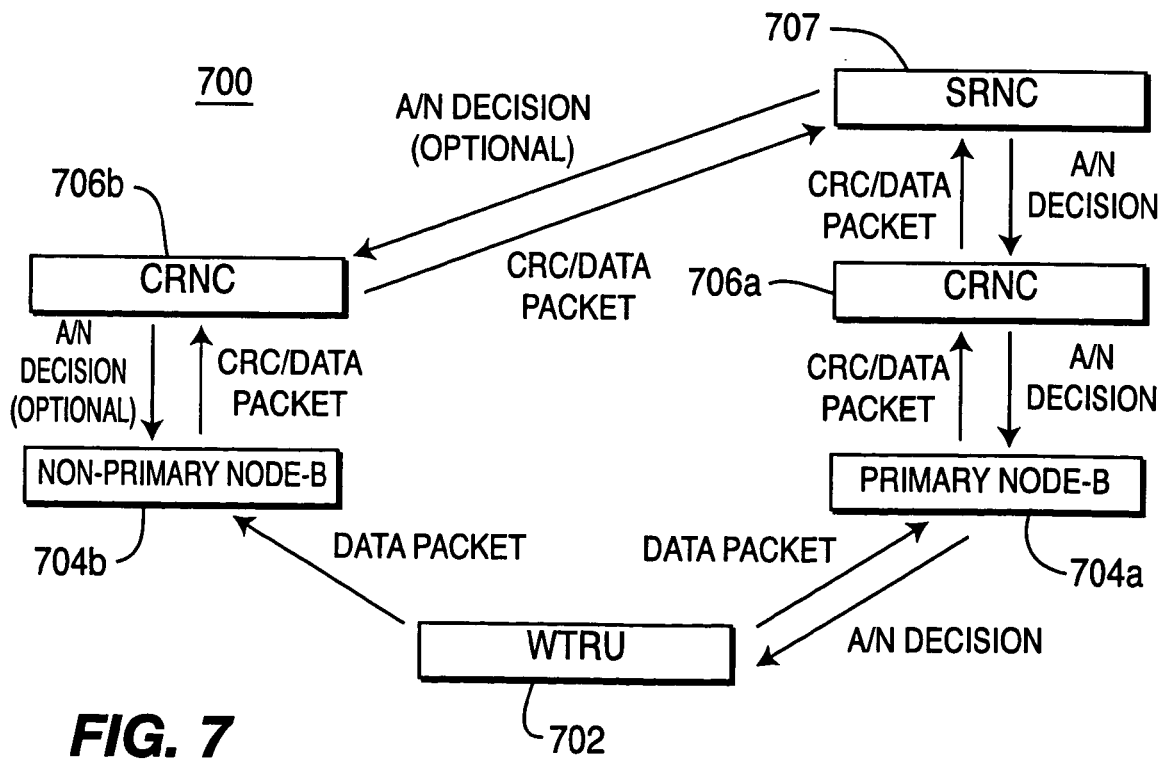

With reference to FIGS. 6 and 7, signaling of the ACK/NACK decision between an RNC and Node-Bs is explained. FIG. 6 shows a system 600 whereby a non-primary Node-B 604b has the same controlling RNC (CRNC) 606 as the primary Node-B 604a. In this case, the CRNC 606 sends an asynchronous ACK to the WTRU 602 via the primary Node-B 604a.

FIG. 7 shows a system 700 whereby a non-primary Node-B 704b has a different CRNC 706b from a CRNC 706a of the primary Node-B 704a. In this case, a serving RNC (SRNC) 707 sends an asynchronous ACK to the WTRU 702 via the primary Node-B 704a.

Figure 2A:
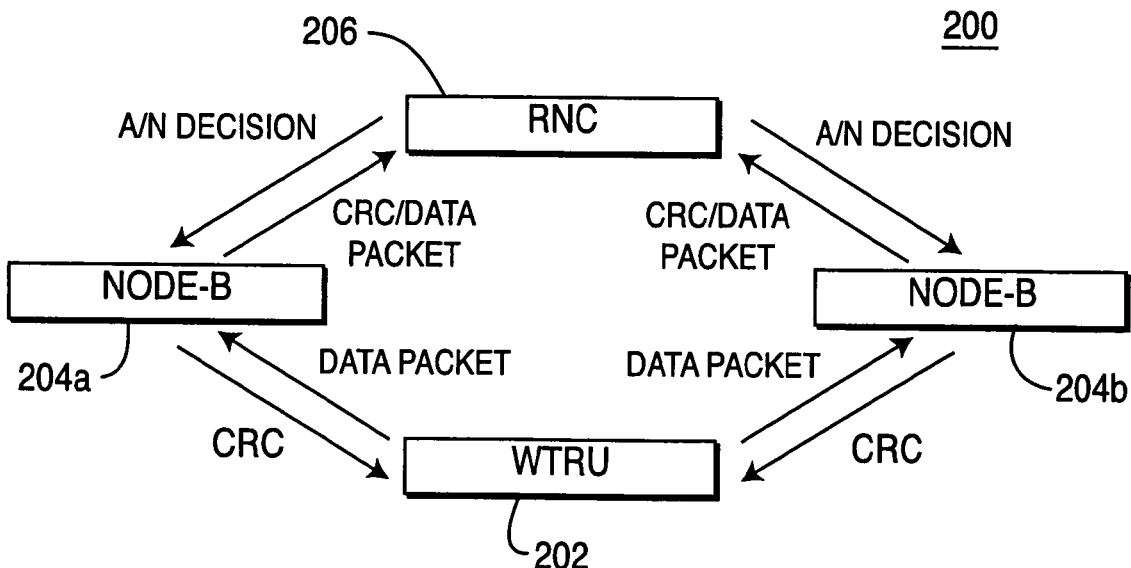
FIGS. 2A and 2B are diagrams of the second embodiment of the present invention.
Figure 2B:
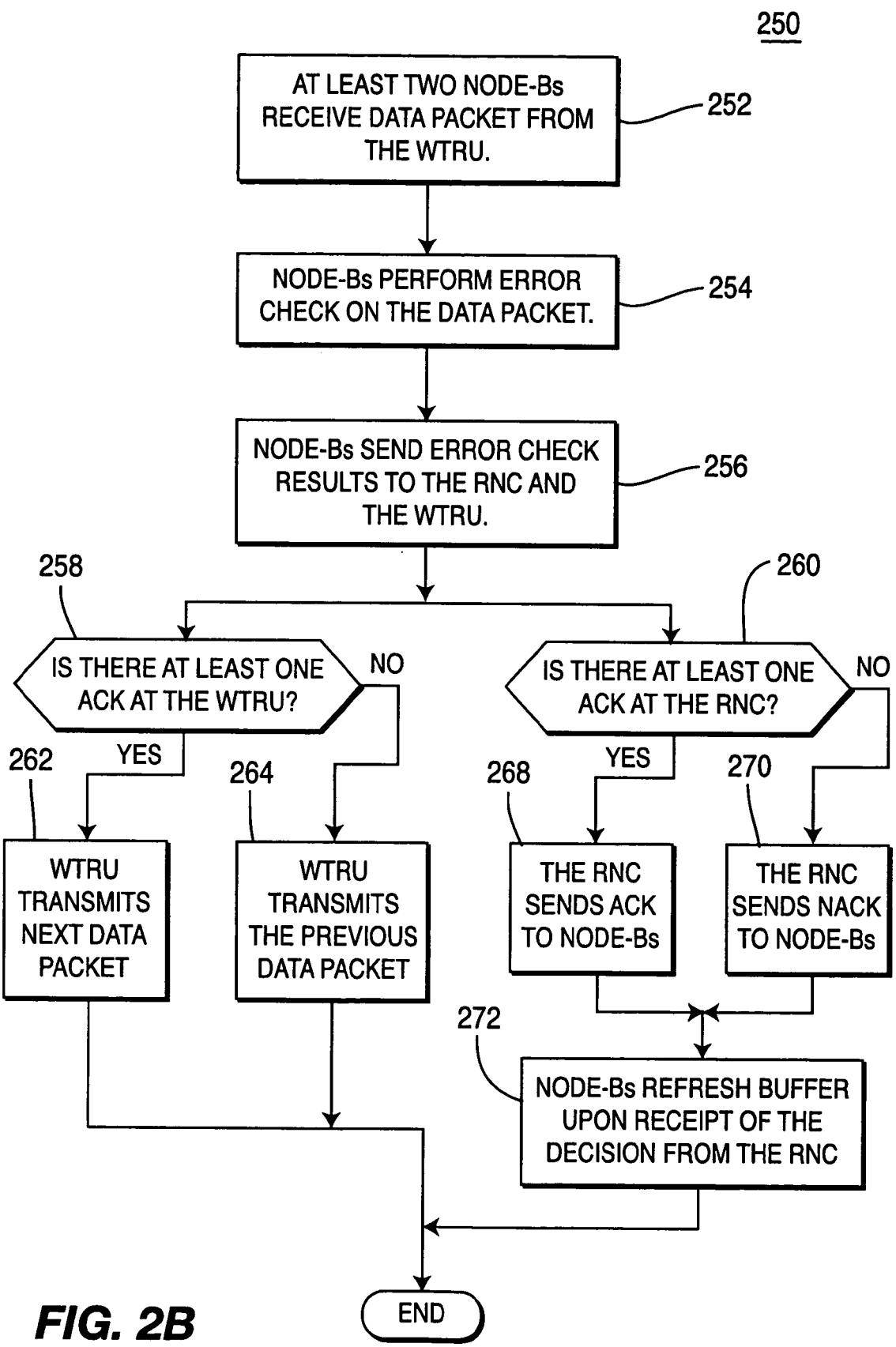

FIGS. 2A and 2B are diagrams of a system 200 and a process 250 of the second embodiment of the present invention. In this second embodiment, incremental combining is performed in each Node-B 204a, 204b whereby each Node-B 204a, 204b combines a previous transmission of a data packet with a retransmission of the same data packet with or without increased redundancy from the WTRU 202.

A WTRU 202 establishes connections with at least two cells controlled by different Node-Bs 204a, 204b for soft handover, and data packets transmitted from the WTRU 202 are received and processed separately by the Node-Bs 204a, 204b (step 252). Each Node-B 204a, 204b performs an error check on the data packet and generates a CRC result (step 254). Each Node-B 204a, 204b transmits the CRC result to the RNC 206. Simultaneously, each Node-B 2041, 204b transmits the CRC result to the WTRU 202 as well (step 256). The WTRU 202 makes a determination regarding whether there is at least one ACK received from Node-Bs 204a, 204b (step 258). The WTRU 202 may receive both ACK and NACK signals from the Node-Bs 204a, 204b. If the WTRU 202 receives no ACK, it schedules retransmission of the data packet (step 264). The Node-Bs 204a, 204b perform incremental combining of the retransmission with the previous transmission. If the WTRU 202 receives at least one ACK from any Node-B 204a, 204b, the WTRU 202 transmits the next data packet (step 262).

The RNC 206 also makes an ACK/NACK decision based on collected ACK/NACK signals from the Node-Bs 204a, 204b (step 260). The RNC 206 generates and transmits an ACK decision (step 268) if the RNC 206 receives at least one ACK from the Node-Bs 204a, 204b. Otherwise, the RNC 206 generates and transmits a NACK decision to the Node-Bs 204a, 204b (step 270). The ACK/NACK decision is transmitted to the Node-Bs 204a, 204b. Each Node-B 204a, 204b refreshes its soft buffer once it receives ACK decision from the RNC 206 (step 272). With this scheme, soft buffer corruption is eliminated.

Figure 3A:
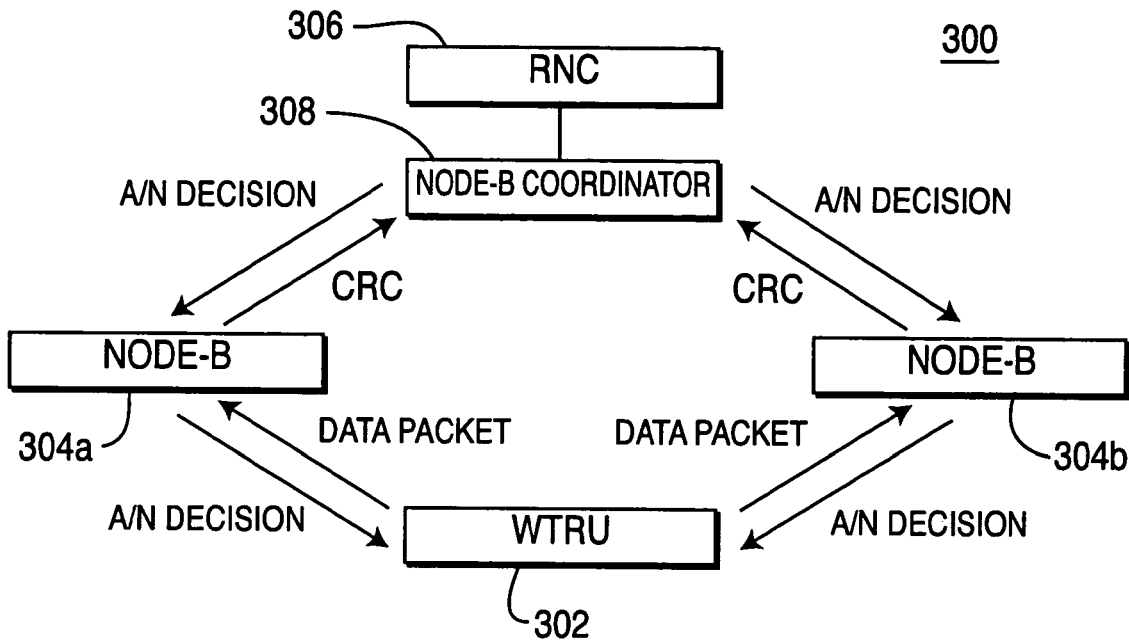
FIGS. 3A and 3B are diagrams of the third embodiment of the present invention.
Figure 3B:
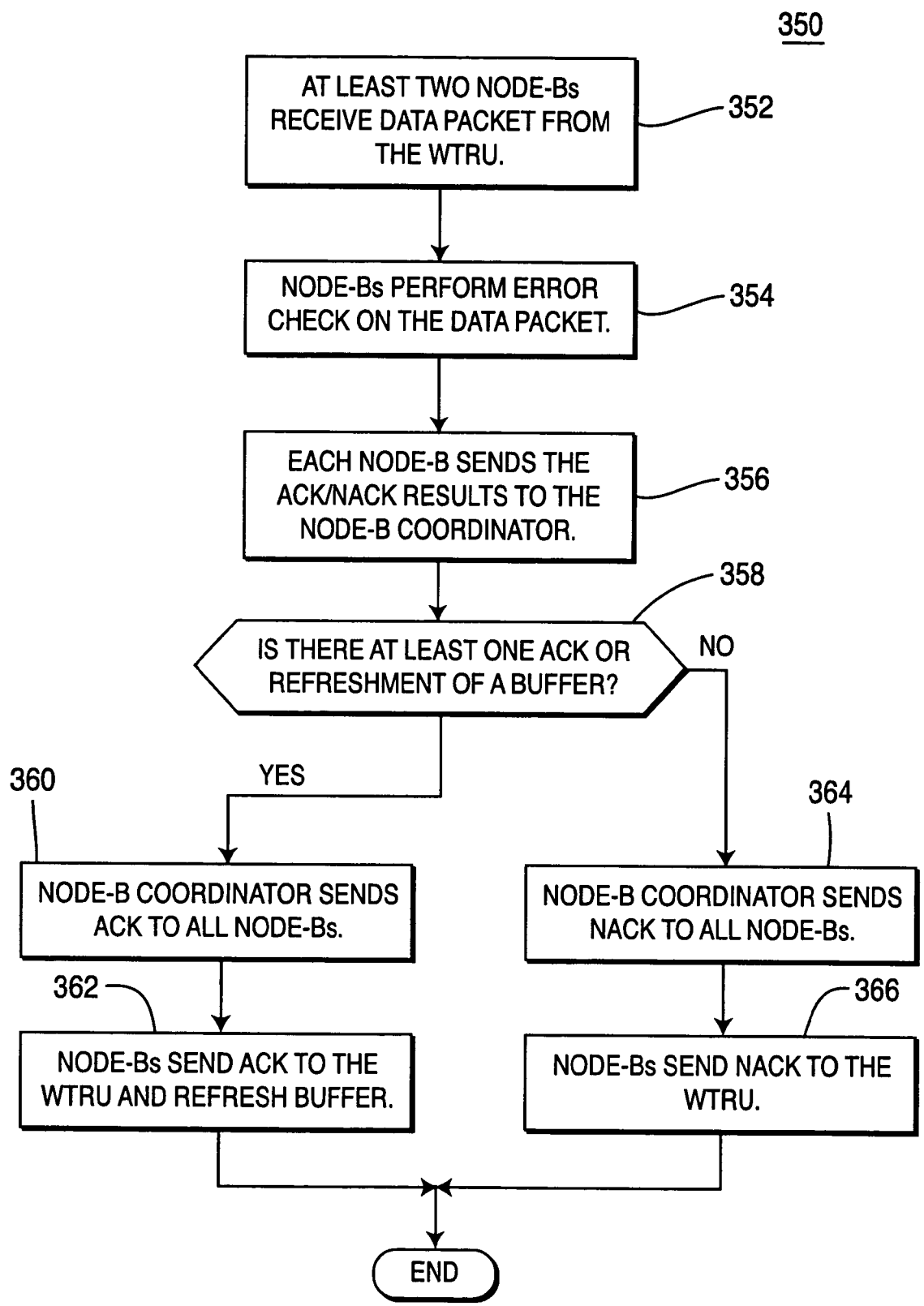

FIGS. 3A and 3B are diagrams of a system 300 and a process 350 of a third embodiment of the present invention. The WTRU 302 establishes at least two connections with cells controlled by different Node-Bs 304a, 304b for soft handover. Data packets transmitted from the WTRU 302 are received and processed separately by at least two Node-Bs 304a, 304b during soft handover (step 352). Each Node-B 304a, 304b performs an error check on the data packet and generates an ACK/NACK result based on the error check on the received data packet (step 354). A Node-B coordinator 308 is provided to coordinate among Node-Bs 304a, 304b, and between Node-Bs 304a, 304b and the RNC 306. Each Node-B 304a, 604b sends the ACK/NACK result to the Node-B coordinator 308 (step 356). In this embodiment, a final decision on whether an ACK or a NACK is transmitted to the WTRU 302 is made by the Node-B coordinator 308. It is determined whether any of the involved Node-Bs 304a, 304b generates an ACK as a result of the error check (step 358). If so, the Node-B coordinator 308 commands each of all the involved Node-Bs 304a, 304b to flush out the corresponding soft buffer and to prepare for a new transmission, regardless of the result of the error check derived at each Node-B 304a, 304b (step 360). In response, each Node-B 304a, 304b sends an ACK to the WTRU 302 and refreshes its soft buffer (step 362).

If the results of the error check from all Node-Bs 304a, 304b fail, (i.e. all of the Node-Bs 304a, 304b generate NACKs) or a response timer Node-B coordinator expires, the Node-B coordinator 308 informs all of the Node-Bs 304a, 304b that they failed to successfully decode the transmitted data packet and that they should prepare for retransmission of the data packet (step 364). In response, the Node-Bs 304a, 304b send an NACK to the WTRU 302 (step 366).

Figure 4A:
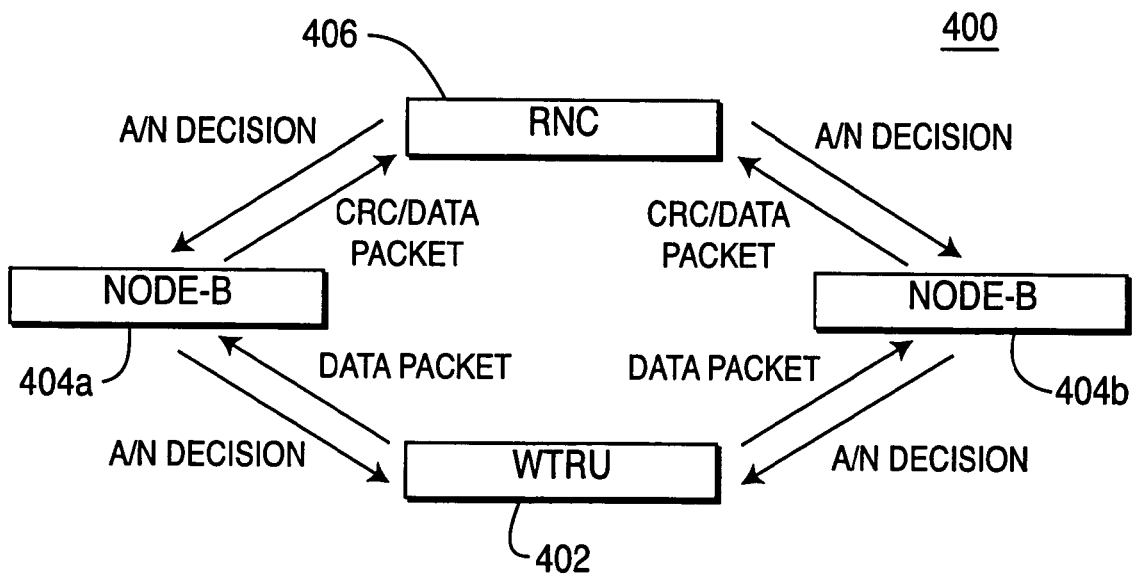
FIGS. 4A and 4B are diagrams of the fourth embodiment of the present invention.
Figure 4B:
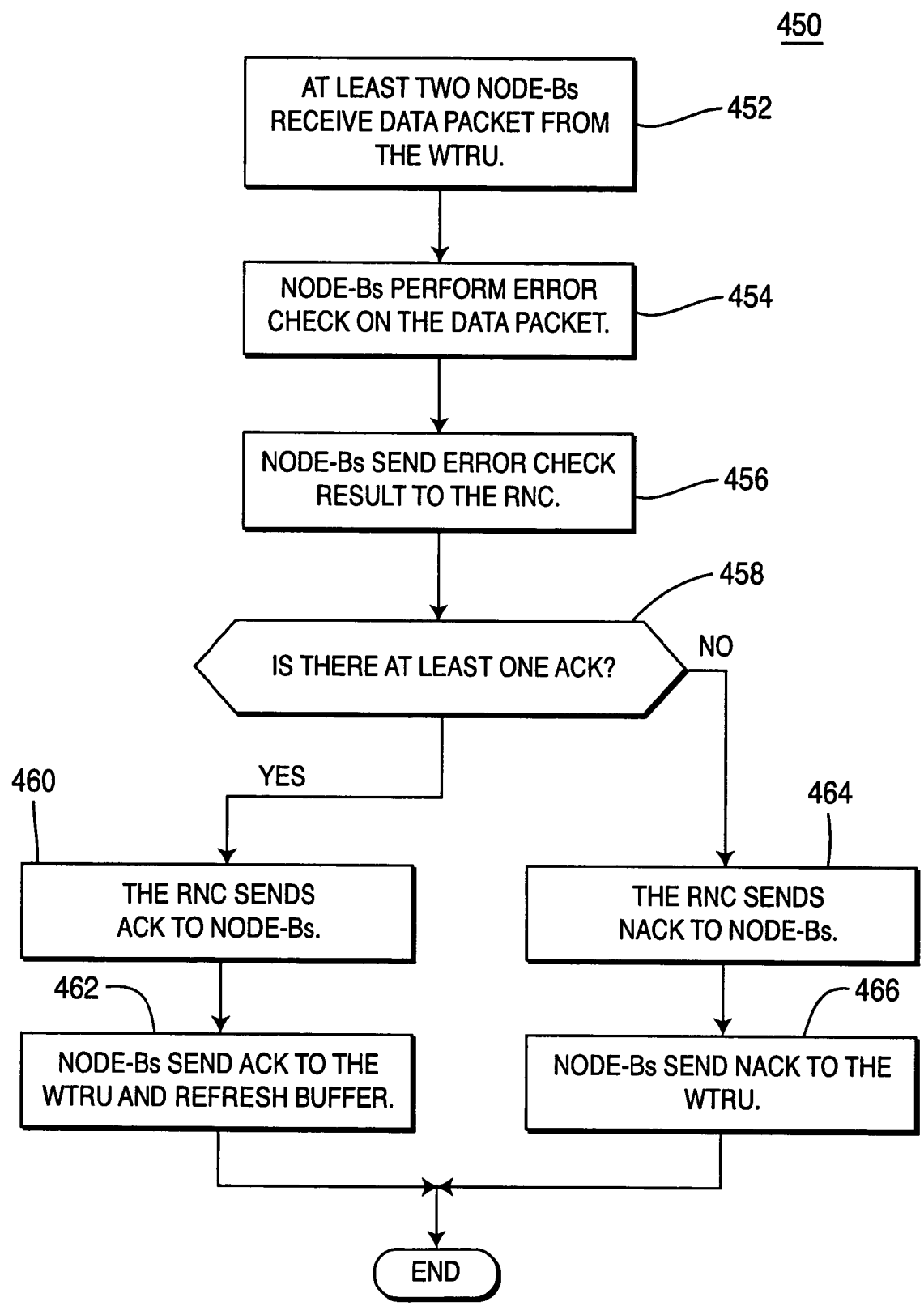

FIGS. 4A and 4B are diagrams of a system 400 and a process 450 of a fourth embodiment of the present invention. For soft handover, a WTRU 402 establishes a separate connection with at least two cells controlled by different Node-Bs 404a, 404b in an active set. Data packets transmitted from the WTRU 402 are received and processed separately by the Node-Bs 404a, 404b during soft handover (step 452). Each Node-B 404a, 404b performs an error check on the received data packets and generates an indication of success or failure in decoding the data packet (step 454).

Each Node-B 404a, 404b transmits a CRC result to the RNC 406 (step 456). If the Node-B 404a, 404b succeeds in decoding the data packet, the Node-B 404a, 404b sends an ACK to the RNC 406 along with the data packet. If the Node-B 404a, 404b fails in decoding the data packet, the Node-B 404a, 404b sends a NACK to the RNC 406. An ACK and NACK may be sent with each data block within Iub/Iur frame protocols between Node-Bs 404a, 404b and the RNC 406. The RNC 406 makes a final ACK/NACK decision regarding the transmission of the data packet from the error check results conducted by the Node-Bs 404a, 404b (step 458). The RNC 406 makes an ACK decision if the RNC 406 receives at least one ACK from the Node-Bs 404a, 404b. Otherwise the RNC 406 makes a NACK decision. The ACK or NACK decision made by the RNC 406 is then transmitted back to the Node-Bs 404a, 404b at steps 460 and 464, respectively. Each Node-B 404a, 404b clears its buffer upon receipt of the ACK decision from the RNC 406. All Node-Bs 404a, 404b transmit the same ACK or NACK signal made by the RNC 406 to the WTRU 402 regardless of the CRC result that each Node-B 404a, 404b individually derived from the data packet (steps 462 and 466). In this case, the WTRU 402 may apply maximum ratio combining (MRC) to the received ACK/NACK feedback signals from the Node-Bs 404a, 404b.

The soft buffer in each Node-B 404a, 404b is managed according to the ACK/NACK decision made by the RNC 406, regardless of the associated error check result derived by the Node-Bs 404a, 404b. Consequently, the fourth embodiment of the present invention allows the RNC 406 to align the soft buffer status in each Node-B 404a, 404b. Additionally, the WTRU 402 can benefit from the soft handover gain for the ACK/NACK signaling, since identical ACK/NACK signaling is transmitted by all Node-Bs 404a, 404b. As such, the WTRU 402 may perform macro diversity combining (maximum ratio combining) for ACK/NACK signaling, since the ACK/NACK signals transmitted back to the WTRU 402 from all the involved Node-Bs 404a, 404b are identical.

A fifth embodiment of the present invention will be explained with reference to FIG. 2A. The fifth embodiment is similar to the second embodiment, except that Node-Bs 204a, 204b do not perform incremental combining during soft handover. A WTRU 202 establishes connections with at least two cells controlled by different Node-Bs 204a, 204b for soft handover. Data packets transmitted from the WTRU 202 are received and processed separately by at least two Node-Bs 204a, 204b during soft handover. Each Node-B 204a, 204b performs an error check on the data packet and transmits an ACK/NACK signal to the WTRU 202. The Node-Bs 204a, 204b send ACKs along with an identification of transmission to an RNC 206. The WTRU 202 sends a sequence of data packets and simultaneously looks at the MAC level for an ACK from any Node-B 204a, 204b when it is in soft handover, and only from the current Node-B when it is not in soft handover. This method causes retransmission when either the time-out threshold is exceeded for an ACK or an out-of-sequence is reported by all cells. Alternatively, this embodiment may be implemented with respect to other embodiments including the first embodiment shown in FIG. 1A.

Figure 8A:
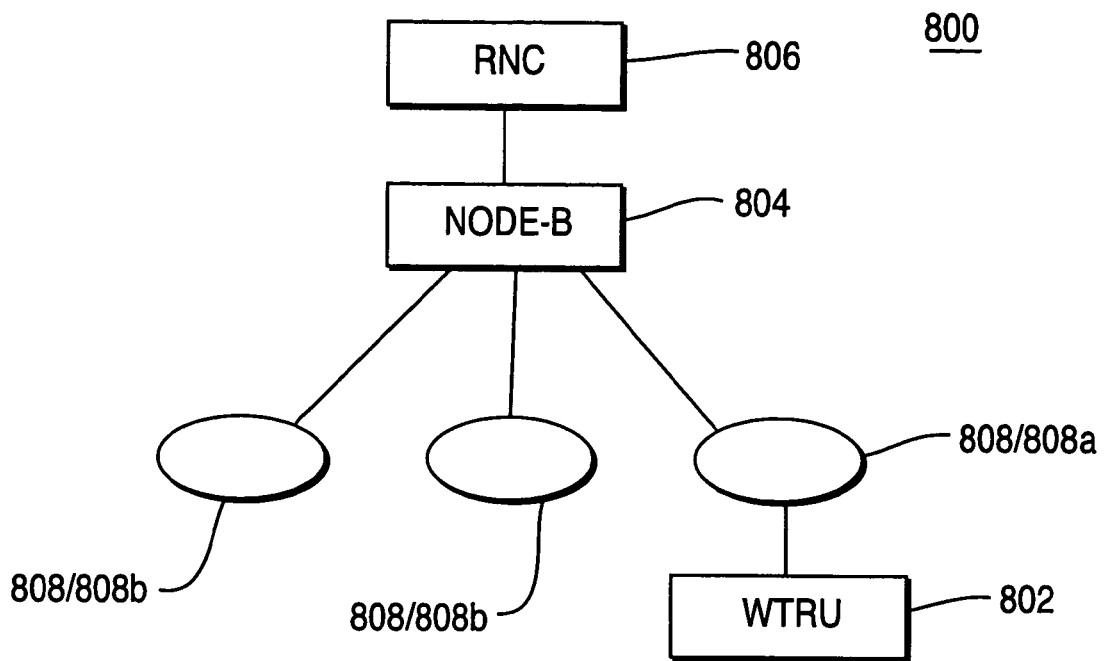
FIGS. 8A and 8B are diagrams of a system and process for softer handover in accordance with the present invention.
Figure 8B:
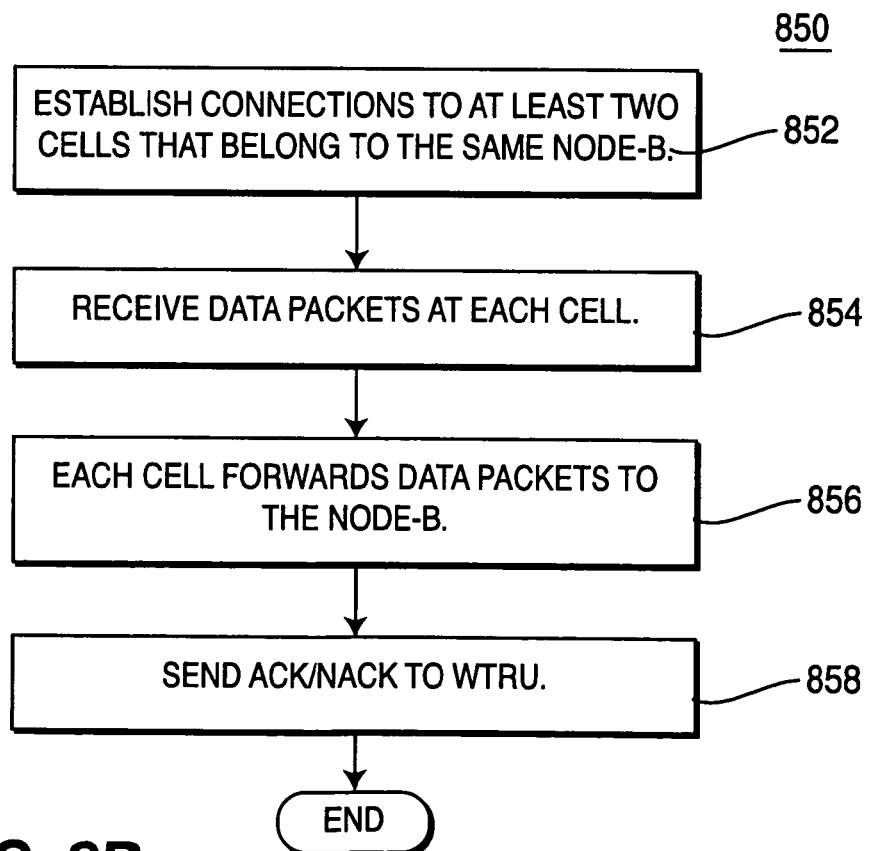

FIGS. 8A and 8B are diagrams of a system 800 and a process 850 for softer handover in accordance with the present invention. During softer handover, the WTRU 802 establishes connections with more than one cell 808 which are controlled by the same Node-B 804 (step 852). EU transmissions from the WTRU 802 are processed by each cell 808 independently (step 854), and each cell 808 transmissions received from the WTRU 802 are processed by the Node-B 804 controlling these cells (step 856). There are two alternatives with respect to incremental combining of transmissions transmitted from the WTRU 802.

In accordance with the first alternative, the Node-B 804 receives data packets from all the involved cells 808 and combines them using a technique, such as maximum ratio combining, before performing error check on the data packet. The resulting combined data packet is error checked at the Node-B 804.

In accordance with the second alternative, each cell 808 processes the data packet individually determining error check on the data packet received from the WTRU 802. The Node-B 804 accepts the data packet that the error check has passed in any of the cells 808 within the active set.

In downlink, the Node-B 804 sends messages including ACK/NACK to the WTRU 802 via all the involved cells 808 (step 858). The WTRU 802 needs to monitor all channels, preferably shared channels, from the involved cells 808 to detect downlink messages. The number of shared channels that the WTRU 802 should monitor from each cell 808 may be limited, such as up to 4 channels.

One of the cells 808 may be designated as a primary cell 808a, while other cells are designated as non-primary cells 808b. The primary cell 808a sends a message on any of the downlink shared channels allocated to the WTRU 802. The message carries a shared channel indicator for non-primary cells 808b. The non-primary cells 808b send messages on the channel indicated by the shared channel indicator. In order to implement this scheme, there is a timing offset between the transmission of the shared channel indicator from the primary cell 808a and the transmission of messages from non-primary cells 808b. The WTRU 802 first monitors all shared channels from the primary cell 808a. Once the WTRU 802 detects that one of the shared channels carry messages to the WTRU 802, the WTRU 802 reads shared channel indicator along with the downlink messages from the primary cell 808a. Then, the WTRU 802 receives messages from the non-primary cells 808b indicated by the shared channel indicator. With this scheme, it is possible to lower the number of channels that the WTRU 802 should monitor. The WTRU 802 then combines the messages received from all the involved cells 808 using a technique, such as maximum ratio combining.

Alternatively, for the DL, only the primary cell 808 a may transmit messages to the WTRU 802. The Node-B 804 transmits downlink messages via the primary cell 808a, while all non-primary cells 808b switch off the downlink signaling to the WTRU 802. With this scheme, the WTRU 802 receive processing is simplified and downlink interference is reduced.

Figure 9:
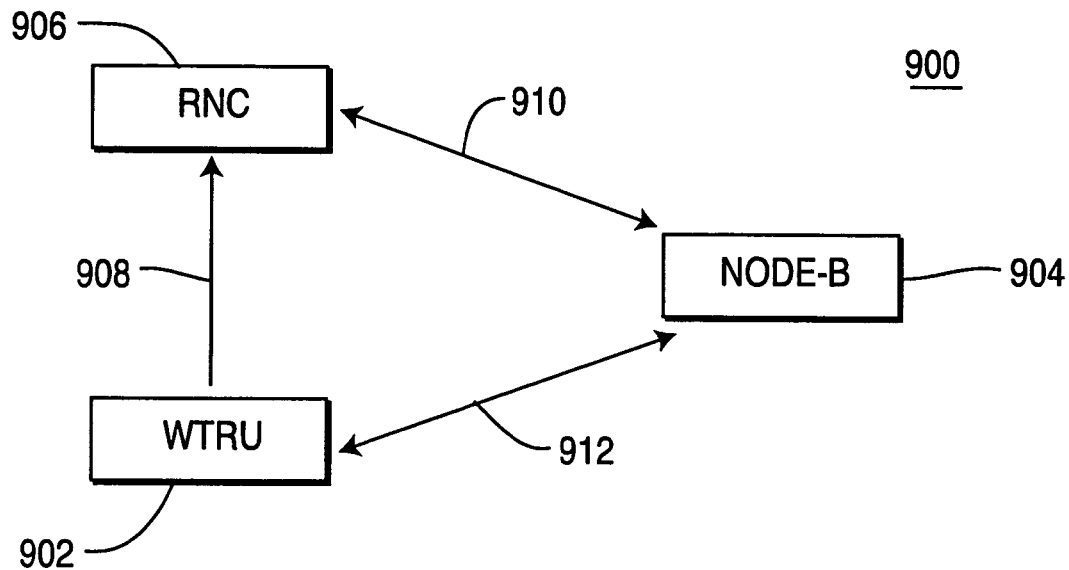
FIG. 9 is a diagram for transferring WTRU-specific information among network entities in accordance with the present invention.

FIG. 9 is a diagram of a system 900 for transferring WTRU-specific information to support EU operation 912 in accordance with the present invention. Initially, an RNC 906 obtains WTRU-specific information from a WTRU 902 using RRC messaging 908 at the initial connection. Then, the WTRU-specific information is forwarded from the RNC 906 to a Node-B 904 to be used in scheduling EU transmissions for the WTRU 902. The transfer of the information from the RNC 906 to the Node-B 904 is via an Iub interface 910, and an Iur interface if an SRNC is not the same as a CRNC. A new signaling mechanism may be utilized to transfer the information from the RNC 906 to the Node-B 904, or alternatively, the existing mechanisms over Iur and Iub interfaces may be modified in order for the RNC 906 to forward relevant WTRU-specific information to the Node-B 904.

Figure 10:
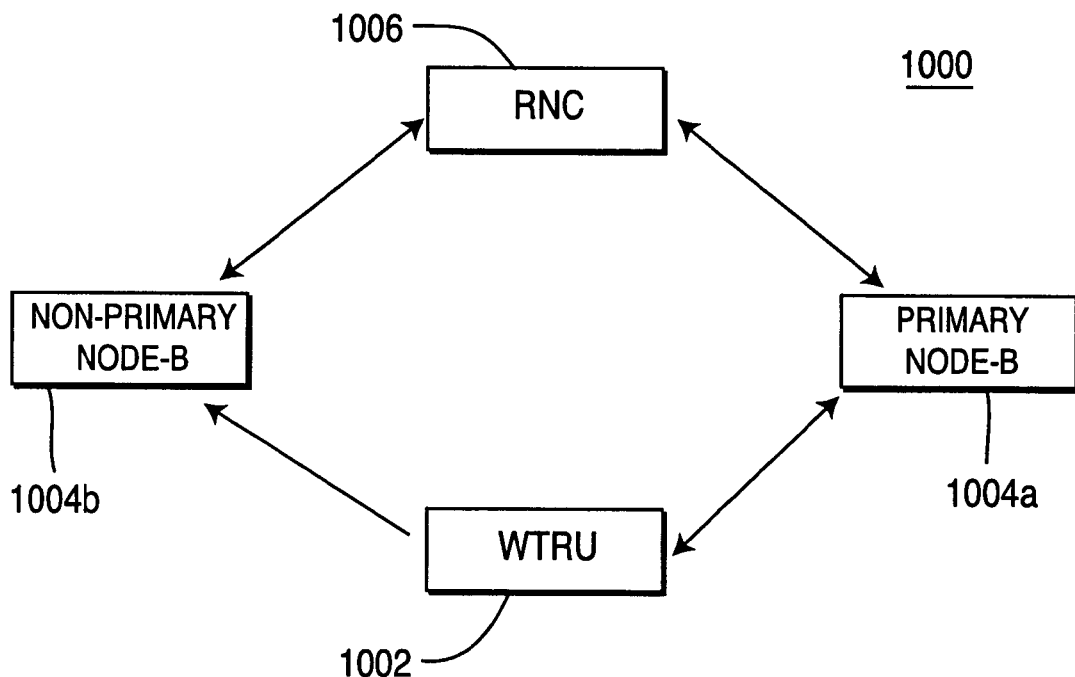
FIG. 10 is a diagram for transferring information during handover among network entities in accordance with the present invention.

FIG. 10 is a diagram of a system 1000 for transferring information among network entities during soft handover in accordance with the present invention. During EU operation, if a WTRU 1002 needs to change the serving cell or the serving Node-B, a softer or soft handover procedure is initiated. Hereinafter, for simplicity, the present invention will be explained only with respect to a soft handover. During soft handover, some information should be communicated between network entities to support EU operation. The information includes, but is not limited to, information related to an active set, information regarding a primary Node-B if the system so designates, EU scheduling/rate information, and ACK/NACK status information.

An RNC 1006 maintains an active set of cells for handover. The RNC 1006 selects and removes cells in the active set based on measurements reported from Node-Bs 1004a, 1004b and the WTRU 1002 and on available radio resources. Once the RNC 1006 selects cells for the active set, the RNC 1006 sends messages to the Node-Bs 1004a, 1004b and the WTRU 1002 to inform the selected cells for the active set to support soft handover for EU. The RNC 1006 also sends messages to update the active set each time the RNC 1006 adds or removes a cell in the active set. The messages may be transmitted using existing RRC and NBAP/RNSAP active set management procedures or new procedures.

Either the RNC 1006 or the Node-Bs 1004a, 1004b and the WTRU 1002 may designate one Node-B as a primary Node-B 1004a and other Node-Bs in the active set as non-primary Node-Bs 1004b during soft handover. The selection of the primary Node-B 1004a is based on UL performance measured and reported by each Node-B 1004a, 1004b and/or DL performance measured and reported by the WTRU 1002.

During soft handover, only the primary Node-B 1004a performs scheduling and assigning radio resources to the WTRU 1002. The primary Node-B 1004a informs the RNC 1006 of scheduled EU transmissions via Iub NBAP signaling or within the EU frame protocol. The RNC 1006 then informs non-primary Node-Bs 1004b of the allocation of radio resources for EU and routing of received data. This is also signaled over NBAP or within the EU frame protocol. Alternatively, non-primary Node-Bs 1004b may be informed by Iub NBAP procedures of sets of EU physical channels for the period each cell is within the active subset. Each non-primary Node-B 1004b within the active set continuously receives these channels independent of radio resources allocation scheduled by the primary Node-B 1004a.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
 a transceiver; and
 a processor; and
 wherein the transceiver and the processor are configured to cause the WTRU to:
 monitor a plurality of cells for ACK/NACK information, each of the plurality of cells including a plurality of downlink channels and each of the plurality of cells being associated with a base station;
 for each of the plurality of cells, determine a subset of the downlink channels for the cell; and
 for each of the plurality of cells, monitor the subset of the downlink channels for one or more downlink messages, wherein the one or more downlink messages include scheduling and rate information for an uplink transmission to the base station.

2. The WTRU of claim 1, wherein the transceiver and the processor are further configured to cause the WTRU to retransmit data in response to any of the plurality of cells transmitting a NACK.

3. The WTRU of claim 1, wherein the transceiver and the processor are further configured to cause the WTRU to receive a shared channel based on the monitored downlink messages.

4. The WTRU of claim 1, wherein at least two of the plurality of cells has a different timing offset.

5. The WTRU of claim 1, wherein one of the plurality of cells is a primary cell and at least one of the plurality of cells is a non-primary cell.

6. The WTRU of claim 5, wherein the transceiver and the processor are further configured to cause the WTRU to receive one or more downlink messages over the monitored downlink channels of the non-primary cell.

7. The WTRU of claim 1, wherein the transceiver and the processor are further configured to monitor all of a plurality of cells for ACK/NACK information.

8. The WTRU of claim 1, wherein the transceiver and the processor are further configured to cause the WTRU to transmit a next data packet in response to receiving an ACK from a cell.

9. The WTRU of claim 1, wherein the transceiver and the processor are further configured to transmit an uplink transmission to the base station, the uplink transmission being transmitted using the scheduling and rate information.

10. A method performed by a wireless transmit/receive unit (WTRU) comprising:
monitoring a plurality of cells for ACK/NACK information, each of the plurality of cells including a plurality of downlink channels and each of the plurality of cells being associated with a base station;
for each of the plurality of cells, determining a subset of the downlink channels for the cell; and
for each of the plurality of cells, monitoring the subset of downlink channels for one or more downlink messages, wherein the one or more downlink messages include scheduling and rate information for an uplink transmission to the base station.

11. The method of claim 10 further comprising retransmitting data in response to any of the plurality of cells transmitting a NACK.

12. The method of claim 10 further comprising receiving a shared channel based on the monitored downlink messages.

13. The method of claim 10, wherein at least two of the plurality of cells has a different timing offset.

14. The method of claim 10, wherein one of the plurality of cells is a primary cell and at least one of the plurality of cells is a non-primary cell.

15. The method of claim 14, further comprising receiving one or more downlink messages over the monitored downlink channels of the non-primary cell.

16. The method of claim 10, further comprising monitoring all of a plurality of cells for ACK/NACK information.

17. The method of claim 10, further comprising transmitting a next data packet in response to receiving an ACK from a cell.

18. The method of claim 10, further comprising transmitting an uplink transmission to the base station, the uplink transmission being transmitted using the scheduling and rate information.

* * * * *